(12) United States Patent
Bhagat et al.

(10) Patent No.: US 10,304,082 B1
(45) Date of Patent: May 28, 2019

(54) PERSONALIZED NETWORK CONTENT GENERATION AND REDIRECTION ACCORDING TO REPEAT BEHAVIOR

(71) Applicant: Amazon Technologies, Inc., Seattle, WA (US)

(72) Inventors: Rahul Hemant Bhagat, Issaquah, WA (US); Jody David Biggs, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 624 days.

(21) Appl. No.: 14/939,525

(22) Filed: Nov. 12, 2015

(51) Int. Cl.
*G06Q 30/00* (2012.01)
*G06Q 30/02* (2012.01)
*G06Q 30/06* (2012.01)

(52) U.S. Cl.
CPC ......... *G06Q 30/0255* (2013.01); *G06Q 30/02* (2013.01); *G06Q 30/0201* (2013.01); *G06Q 30/0625* (2013.01); *G06Q 30/0631* (2013.01)

(58) Field of Classification Search
None
See application file for complete search history.

(56) References Cited

U.S. PATENT DOCUMENTS

| 7,720,720 | B1 * | 5/2010 | Sharma | G06Q 30/0631 |
| | | | | 705/26.7 |
| 8,838,583 | B1 * | 9/2014 | Fox | G06F 17/3053 |
| | | | | 707/723 |
| 2010/0191582 | A1 * | 7/2010 | Dicker | G06Q 30/02 |
| | | | | 705/14.51 |
| 2013/0262216 | A1 * | 10/2013 | Zhang | G06Q 30/02 |
| | | | | 705/14.36 |
| 2013/0339126 | A1 * | 12/2013 | Cui | G06Q 30/02 |
| | | | | 705/14.41 |
| 2015/0006314 | A1 * | 1/2015 | Goulart | G06Q 30/0631 |
| | | | | 705/26.7 |
| 2016/0162974 | A1 * | 6/2016 | Lee | G06Q 30/0631 |
| | | | | 705/26.7 |
| 2017/0024424 | A1 * | 1/2017 | Almohizea | G06F 17/30327 |

OTHER PUBLICATIONS

Choi, Yoon Kyoung, An Auxiliary Recommendation System for Repetitively Purchasing Items in E-Commerce, Jan. 1, 2014, 2014 International Conference on Big Data and Smart Computing, pp. 96-98 (Year: 2014).*

* cited by examiner

*Primary Examiner* — William J Allen
*Assistant Examiner* — Timothy J Kang
(74) *Attorney, Agent, or Firm* — Thomas | Horstemeyer, LLP

(57) ABSTRACT

Disclosed are various embodiments for predicting repeated behavior by an entity with respect to a particular item. In some embodiments, a network page including a recommendation for the particular item may be generated according to an expectation of repeated behavior. In some embodiments, an entity requesting results to a search query may be redirected to an alternative network page associated with the particular item instead of a search results page according the expectation of repeated behavior.

20 Claims, 11 Drawing Sheets

PERSONALIZED NETWORK CONTENT GENERATION AND REDIRECTION ACCORDING TO REPEAT BEHAVIOR

BACKGROUND

An electronic marketplace may include listings of items offered for sale, lease, download, rent, etc., by many different entities. Users may use the electronic marketplace to purchase, lease, download, rent, etc., items of interest. In some instances, users may repeat behavior with respect to particular items of interest.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to determining an expectation of repeat behavior by an entity (e.g., a user, a customer, etc.) with respect to a particular item. In addition, the present disclosure relates to generating personalized recommendations for items based in part on the expectation of repeat behavior. Further, the present disclosure relates to redirecting entities requesting search results in response to a search query to alternative network content (e.g., a item detail page, a shopping cart page with item automatically included in shopping cart, a dialog box requesting confirmation to order item, etc.) instead of a search results page. The determination to redirect may be based in part on the expectation of repeat behavior by the entity with respect to a particular item, interaction history, profile data, marketing/advertising contracts, specificity of the search query, and so on.

In some embodiments, an expectation of repeat behavior by an entity with respect to a particular item may be determined. For example, an entity may be a customer of an electronic marketplace through which one or more items may be purchased, leased, downloaded, rented, etc. Purchasing history for the particular entity (e.g., a customer of an electronic marketplace) may indicate that the customer has purchased a particular item multiple times. This information not only indicates an interest in the item, but also may be used to determine an expectation of repeat behavior (e.g., actual purchase of the item) during a given time period.

According to various embodiments, the expectation of repeat behavior may be determined by using one or more repeat behavior models. The repeat behavior models may be based on a maximum likelihood model, a Poisson-Gamma mixture model, a modified Poisson-Gamma mixture model, and/or other appropriate models for modeling the repeat behavior of entities with respect to a particular item. The repeat behavior models may use information (e.g., date(s) of behavior, rate of behavior, mean repeat behavior periodicity, predefined time periods, etc.) of a particular entity and/or other entities whose behavior also indicates a repeat behavior associated with a particular item.

Figure 1:
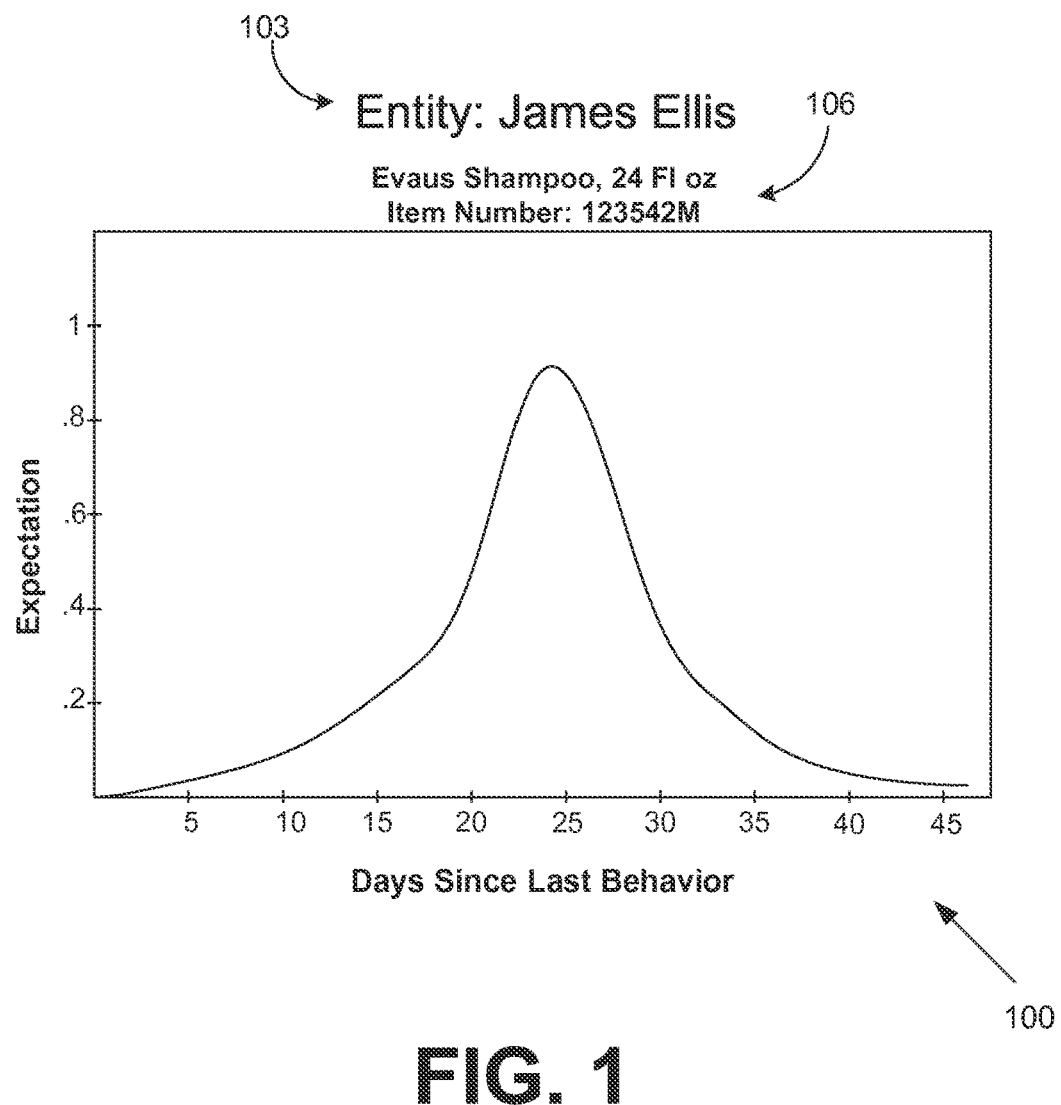
FIG. 1 is a graphical representation of an example of an expectation of repeat behavior by an entity with respect to an item according to various embodiments of the present disclosure.

FIG. 1 illustrates a graphical representation of an example of an expectation of repeated behavior by entity 103 ("James Ellis") with respect to a repeat purchase of item 106 ("Evaus Shampoo, 24 Fl. oz."). For example, FIG. 1 illustrates the expectation rising after the day of the last order until it reaches its peak height for repeated behavior. Once the expectation reaches its peak height, the expectation begins to gradually fall. Accordingly, in this particular example, the entity 103 is most likely to repeat his or her behavior twenty to twenty-five days after the prior purchase.

In other embodiments, the expectation of repeat behavior can be used as a factor in determining whether to generate a recommendation for an entity 103 with respect to an item 106. In some embodiments, a recommendation may be generated for the item 106 and sent to the entity 103 during a time period that the expectation of repeat behavior associated with the item meets or exceeds a predefined threshold. For example, in the example of FIG. 1, assume that the entity 103 interacts with the electronic marketplace offering the item 106 "Evaus Shampoo" for purchase twenty-four days after a prior purchase of the item 106. Further, assume that the expectation of repeat behavior for that date meets or exceeds a predefined threshold. Accordingly, a network page including a recommendation of the item may be generated and sent to the client device associated with the entity 103. The network page may comprise any network page associated with the electronic marketplace such as, for example, a recommendation page, a check-out page, a shopping cart page, an item detail page, a search results page, an electronic marketplace home page, and/or other type of network page associated with the electronic marketplace. The recommendation may include selectable components configured to facilitate repetition of the behavior by the entity 103 for the particular item 106 (e.g., facilitate purchase of the item via the electronic marketplace, etc.). In other embodiments, the recommendation may be included in an electronic message such as, for example, an email message, an instant message, a mobile device notification, a social media notification, and/or other type of message that may be received within a computing device.

In other embodiments, an entity 103 may request search results for a particular search query. In some embodiments, various factors such as, for example, the expectation of repeat behavior by the entity 103 with respect to a particular item 106, interaction history, profile data, marketing/advertising contracts, etc., may be evaluated with respect to the search query and/or the search results. Based on the evaluation of the factors, the entity may be redirected to an alternative network page (e.g., a item detail page, a shopping cart page with item automatically included in shopping cart, a dialog box requesting confirmation to order item, etc.) for a particular item 106 instead of being directed to a search results page listing the search results for a particular item. In one non-limiting example, assume that the entity 103 searches for "paper towels." The search results may include a listing of different brands of paper towels. However, the user profile data may indicate that the entity has an interest in a particular brand of paper towels based in part on interaction history (e.g., purchasing history, browsing history, ratings history, etc.). For example, the entity may have rated a particular brand of paper towels highly and/or previously purchased the particular brand of paper towels. In some embodiments, a score may be generated with respect to weighted values assigned to each of the factors. If the score meets or exceeds a predefined threshold, the entity 103 may be automatically redirected to an item detail page associated with the particular brand of paper towels rather than to a search results page including a listing of different brands of paper towels. The item detail page may include a search results component that when selected would redirect the entity 103 to the initially requested search results page. In some embodiments, the item 106 may be automatically added to a shopping cart, and the entity 103 may be redirected to a shopping cart network page indicating that the item has been added to the shopping cart for ordering. The entity 103 may be requested to confirm/deny the addition of the item and/or may be presented with an option to view the originally requested search results.

In some embodiments, a vendor of a particular item 106 may request that any time a search query is received that is associated with the particular item 106, the requesting entity 103 may be automatically redirected to the item detail page of the particular item 106. For example, assume that the vendor offers a type of cooler for sale via the electronic marketplace. Further, assume that the vendor may have a contract with the electronic marketplace such that in response to receiving a search query for "cooler," the electronic marketplace automatically redirects the requesting entity to an item detail page of the cooler offered for sale by the vendor instead of the typical, relevance-based search results associated with the search query. The item detail page may include a search results component that when selected would redirect the entity 103 to the initially requested search results page. In the following discussion, a general description of the system and its components is provided, followed by a discussion of the operation of the same.

Figure 2:
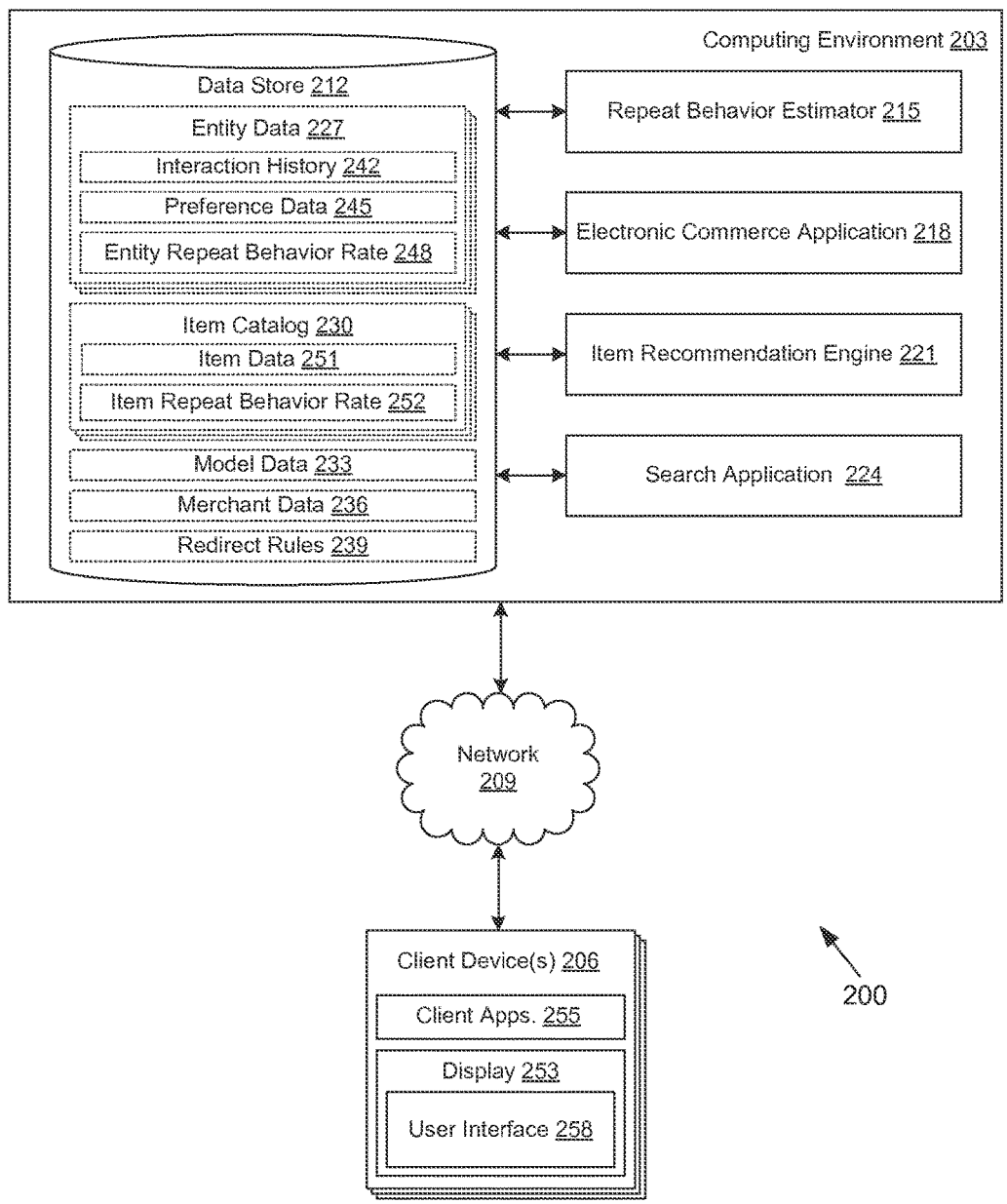
FIG. 2 is a schematic block diagram of a networked environment according to various embodiments of the present disclosure.

With reference to FIG. 2, shown is a networked environment 200 according to various embodiments. The networked environment 200 includes a computing environment 203 in data communication with one or more client devices 206 via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a repeat behavior estimator 215, an electronic commerce application 218, an item recommendation engine 221, a search application 224, and other applications, services, processes, systems, engines, or functionality not discussed in detail herein. The repeat behavior estimator 215 is executed to determine an expectation of repeat behavior by entities with respect to a particular item. To this end, the repeat behavior estimator 215 analyzes various behavior data collected regarding one or more entities and applies the data to one or more types of prediction models to determine an expectation of repeat behavior. In some embodiments, the repeat behavior estimator 215 may learn from additional behavior and re-evaluate the expectation of repeated behavior periodically and/or randomly. For example, via machine learning approaches, additional behavior may be used to update and/or improve the accuracy of the predictions by the repeat behavior model.

The electronic commerce application 218 is executed in order to facilitate the online purchase of items from one or more electronic marketplaces over the network 209. Such items may include products, goods, services, digital content, and/or other items. The electronic commerce application 218 also performs various backend functions associated with the online presence of an electronic marketplace in order to facilitate the online purchase of items. For example, the electronic commerce application 218 generates network pages such as, for example, web pages and/or other types of network content that are provided to client devices 206 for the purposes of promoting and selecting items for purchase, rental, download, lease, or any other forms of consumption.

The item recommendation engine 221 is executed to generate one or more personalized recommendations of an item offered for sale, lease, rent, download, etc., via one or more electronic marketplaces. To this end, the item recommendation engine 221 may analyze various behavioral data collected regarding an entity and select one or more items to recommend based in part on the analysis. In some embodiments, the item recommendation engine 221 may generate a recommendation based at least in part on an expectation of repeat behavior by the entity 103 with respect to a particular item 106. In some embodiments, the item recommendation engine 221 may evaluate one or more factors (e.g., interaction history, expectation of repeat behavior, etc.) for multiple items 106 and generate a score for each item 106 based in part on the one or more factors. To this end, the item recommendation engine 221 may rank the items 106 based at least in part on the score and select one or more items according to the ranking. The item recommendation engine 221 may generate one or more personalized recommendations for the one or more items 106.

The search application 224 may be executed in response to receiving a search query via network content associated with electronic commerce application 218. In some embodiments, the search application 224 may generate search results associated with the search query. In other embodiments, the search application 224 may retrieve cached search results that were previously generated for the same and/or similar search query. In some embodiments, the search application 224 may evaluate one or more factors (e.g., an expectation of repeat behavior by the entity 103 with respect to a particular item 106, interaction history, profile data, marketing/advertising contracts, etc.) to determine whether to automatically redirect an entity 103 interacting with an electronic commerce application 218 to an item detail page associated with a particular item 106 instead of a search results page that lists the search results for a given search query.

The data stored in the data store 212 includes, for example, entity data 227, an item catalog 230, model data 233, merchant data 236, redirect rules 239, and potentially other data. The entity data 227 may include various information collected from or generated regarding entities (e.g., a user, a customer, etc.) interacting with the electronic commerce application 218. The entity data 227 may include interaction history 242, preference data 245, an entity repeat behavior rate 248, and/or other information. The interaction history 242 may include information specific to an entity such as, for example, a purchase history, a browsing history, a viewing history, a rating history, and/or other information that reflects a prior interaction of the entity with the computing environment 203. The preference data 245 may include information related to preferences of items, brands of items, quantity of items, and/or other information. The entity repeat behavior rate 248 may include a mean repeat behavior rate (e.g., rate of purchase) by the particular entity 103 for a particular item 106. For example, during a predefined time period the entity mean repeat behavior rate 248 may be based in part on the time $t_0$ that when the entity 103 first purchased an item 106, the time $t_{last}$ that the entity 103 last purchased the item 106, and the number of repeat behaviors "x" during a predefined time period. The repeat behavior rate may be expressed as follows:

$$T_{mean} = \frac{t_{last} - t_0}{x} \quad (1)$$

The item catalog 230 includes data regarding items offered for order through the electronic commerce application 218. Such items may include products, goods, services, digital content, and/or other items. The item catalog 230 may include item data 251, item repeat behavior rate 252, and/or other information. The item data 251 may include titles, descriptions, weights, prices, quantities available, export restrictions, customer reviews, customer ratings, images, videos, version information, availability information, shipping information, and/or other data. The item repeat behavior rate 252 includes the mean and/or average rate of repeat behavior for a particular item 106 that is based at least in part on a rate of repurchase by entities 103 who have exhibited a repeat behavior with respect to the particular item 106.

The model data 233 includes information regarding one or more behavior models that the repeat behavior estimator 215 may employ in determining the expectation of repeat behavior. The model data 233 may include repeat behavior models such as, for example, a maximum likelihood model, a Poisson-Gamma mixture model, a modified Poisson-Gamma mixture model, and/or other appropriate models for modeling the repeat behavior of entities 103 with respect to a particular item 106. The repeat behavior models may use information (e.g., date(s) of behavior, rate of behavior, mean repeat behavior rate, predefined time periods, etc.) of a particular entity 103 and/or other entities 103 whose behavior also indicates a repeat behavior associated with a particular item 106.

The merchant data 236 includes various data relating to merchants who have offered items 106 for ordering through an electronic marketplace. The merchant data 236 may include, for example, data relating to advertising agreements, purchasing agreements, purchase orders, inventory data, order data, customer data, and/or other data. For example, the merchant data 236 may include specific advertising agreements that dictate whether in response to a particular search query, an entity 103 is to be redirected to an alternative network page associated with an item 106 offered by the merchant instead of providing a search results listing to the entity 103.

The redirect rules 239 may include one or more rules related to whether an alternative network page associated with an item 106 should be sent to an entity 103 instead of a search results page in response to receiving a search query. In some embodiments, the redirect rules 239 may include thresholds related to expectation of repeat behavior, scores associated with a level of interest in the item based at least in part on interaction history, and/or other information. For example, the redirect rules 239 may include a threshold level for the expectation of repeat behavior such that if the expectation of repeat behavior by the entity 103 with respect to the item 106 meets or exceeds a predefined threshold, the entity 103 will be redirected to an alternative network page associated with the item 106 rather than the originally requested search results page. In another embodiment, various factors (e.g., interaction history, preference data, expectation of repeat behavior, etc.) may be assigned a weight and the sum of weighted values may be compared to a predefined threshold to determine whether the entity should be redirected to an alternative network page associated with the item 106 instead of the originally requested search results page. In another non-limiting example, the redirect rules 239 may include rules related to advertising agreements for particular merchants as reflected in the merchant data 236.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206 may include a display 253. The display 253 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 255 and/or other applications. The client application 255 may be executed in a client device 206, for example, to access network content served up by the computing environment 203 and/or other servers, thereby rendering a user interface 258 on the display 253. To this end, the client application 255 may comprise, for example, a browser, a dedicated application, etc., and the user interface 258 may comprise a network page, an application screen, etc. The client device 206 may be configured to execute applications beyond the client application 255 such as, for example, email applications, social networking applications, word processors, spreadsheets, and/or other applications.

Next, a general description of the operation of the various components of the networked environment 200 is provided. To begin, the electronic commerce application 218 may monitor interactions by entities 103 with network content provided by the electronic commerce application 218. The interactions may provide information about entity behavior with respect to items 106 offered for ordering via the electronic commerce application 218. The entity behavior may be collected and stored in association with the entity data 227. The repeat behavior estimator 215 may use the entity behavior associated with a large set of entities 103 to establish the models used to determine an expectation of repeat behavior by an entity 103 of a particular item 106.

In some embodiments, the expectation of repeat behavior may be used as a factor by the item recommendation engine 221 in determining which items 106 to include in a recommendation for a particular entity. In other embodiments, the expectation of repeat behavior may be used as a factor by the search application 224 in determining whether to redirect an entity to an alternative network page (e.g., item detail page, shopping cart page with item automatically included in shopping cart, dialog box requesting confirmation to order item, etc.) specific to a particular item 106 instead of providing a requested search results page in response to receiving a search query from a client device 206 associated with a particular entity 103.

The repeat behavior estimator 215 may determine the expectation of repeat behavior in part on the application of one or more repeat behavior models. In one embodiment, the expectation of repeat behavior may be based in part on a maximum likelihood model. The maximum likelihood model may be used to predict the probability that an item 106 has a specific repeat behavior periodicity. The maximum likelihood model provides a maximum likelihood estimate of repeat behavior periodicity across all entities 103 for a particular item 106. According to the maximum likelihood model, the mean repeat behavior rate of all entities 103 who have repeated behavior associated with the particular item 106 follows a log-normal distribution. Using the maximum likelihood model, the expectation of repeat behavior may be expressed as follows:

$$d = \frac{1}{T_2 * \sigma * \sqrt{2\pi}} e^{\frac{-\ln(T_2 - \mu^2)}{2 * \sigma^2}} \quad (2)$$

where $T_2$ is the time unit elapsed between the time ($t_{last}$) when the entity 103 last exhibited the behavior with respect to the item 106 and the time ($t_{end}$) that an observation time period ends, $\mu$ and $\sigma$ correspond to the mean and standard deviation of the log-normal fit for repeat behavior periodicities of an item 106 across all entities 103 who repeated the behavior associated with the item 106, and d is the probability density at $T_2$, and can be used as the predictive score for the likelihood of repeat purchase (i.e., the expectation of repeat behavior). In some embodiments, the expectation of repeat behavior is only considered by the item recommendation engine 221 and/or the search application 224 when a repeat entity probability (REP) meets or exceeds a predefined threshold. The REP can be determined as follows:

$$REP_a = \frac{\text{\# entities who exhibited repeat behavior with item}}{\text{\# of entities who exhibited behavior with item}} \quad (3)$$

In some embodiments, the repeat behavior estimator 215 determines the expectation of repeat behavior using a Poisson-Gamma mixture model (PGMM). The expectation of repeat behavior as determined via the PGMM model can be used by the item recommendation engine 221 and the search application 224 to provide personalized and/or more relevant information for a particular entity 103 with respect to a particular item 106. The PGMM model is based on the following assumptions: (1) repeat behavior of an entity follows a Poisson distribution with a repeat behavior rate $\lambda$ and (2) $\lambda$ across all entities follows a gamma distribution with shape $\alpha$ and rate $\beta$. It should be noted that the shape $\alpha$ and rate $\beta$ parameters for the gamma distribution can be determined via gradient descent and/or other types of optimization algorithms with respect to the behaviors of all entities exhibiting repeat behavior with respect to a particular item.

Using the PGMM, the expectation of repeat behavior by an entity 103 for a particular item 106 may be determined as follows:

$$e = \frac{x + \alpha}{T + \beta} \quad (4)$$

wherein T corresponds to the time unites elapsed between the time ($t_0$) when the entity 103 first exhibited the behavior with respect to the item 106 and the time ($t_{end}$) when the observation period ends, x corresponds to the number of repeat behaviors by the entity 103 with respect to the item 106 between $t_0$ and $t_{end}$ excluding the first behavior, $\alpha$ and $\beta$ correspond to the shape and rate parameters for the gamma prior for the particular item 106, and e corresponds to the expected number of repeat behaviors of the item 106 by the entity 103 in one time unit after $t_{end}$.

In other embodiments, the repeat behavior estimator 215 applies a modified Poisson-Gamma mixture model (MPGMM) to determine the expectation of repeat behaviors. Unlike the PGMM, the MPGMM does not assume that the expected number of repeat behavior by an entity is highest in the time unit immediately following the last behavior. Rather, the MPGMM relies on an estimate of entities mean repeat behavior periodicity for a specific item 106 based in part on the first and last behavior by the entity 103 with respect to the specific item 106. Accordingly, the MPGMM is a modified version of the PGMM to assign the highest repeat behavior expectation (e) at the mean repeat behavior periodicity of the item 106 for the entity 103.

Using the MPGMM, the repeat behavior estimator 215 determines the expectation of repeat behavior as follows:

If $T_2 < 2*T_{mean}$:

$$e = \frac{x+\alpha}{T_1 + 2* + \text{abs}(T_{mean} - T_2) + \beta} \quad (5)$$

If $T_2 \geq 2*T_{mean}$, use Equation (4):

$$e = \frac{x+\alpha}{T+\beta} \quad (4)$$

where $T_1$ corresponds to the time units elapsed between the time $t_0$ of the first behavior of the customer with respect to item 106 and the time $t_{last}$ of the last behavior of the entity 103 with respect to the item 106, $T_2$ corresponds to the time units elapsed between $t_{last}$ and the end of the observed time period $t_{end}$, x corresponds to the number of repeat behaviors by the entity 103 between $t_0$ and $t_{last}$ excluding the first behavior, $\alpha$ and $\beta$ correspond to the shape and rate parameters for the gamma prior for the particular item 106, $T_{mean}$ corresponds to the mean repeat behavior periodicity of the entity 103 for the item 106, and e corresponds to the expected number of repeat behaviors by the entity 103 with respect to the item 106.

It should be noted that since the expectation of repeat behavior is dependent upon the behavior of the entity 103 as well as other entities 103 exhibiting repeat behavior with respect to a particular item 106, the variables such as, for example, the learning parameters (e.g., $\alpha$ and $\beta$) and the entity repeat behavior rate 248, may change over time. Accordingly, in some embodiments, the repeat behavior estimator 215 may periodically, randomly, and/or intermittently update the model data 233 and update the expectation of repeat behavior based in part on the changed variables.

The item recommendation engine 221 generates recommendations to present to entities 103 interacting with network pages associated with the electronic commerce application 218. In some embodiments, the item recommendation engine 221 may select a particular item 106 to recommend based at least in part on the expectation of repeat behavior by the entity 103 for the particular item 106. The item recommendation engine 221 may request the repeat behavior estimator 215 to recalculate the expectation or repeat behavior. In other embodiments, the item recommendation engine 221 may access stored data of predetermined expectation of repeat behavior values for the entity 103 with regard to a particular item 106.

In one non-limiting example, the item recommendation engine 221 may analyze the item catalog 230 and rank at least a subset of items 106 from the item catalog 230 according to an expectation of repeat behavior by the entity for the at least a subset of items 106. The item recommendation engine 221 may select one or more items 106 to generate a recommendation according to a highest ranked item 106, a predefined percentage and/or quantity of the highest ranked items, and so on. In some embodiments, the item recommendation engine 221 may select a percentage and/or quantity of items 106 that have a corresponding expectation of repeat behavior exceeding a predefined threshold.

In other embodiments, the item recommendation engine 221 may use the expectation of repeat behavior as one of a plurality of factors to select an item 106 for which a recommendation is to be generated. The factors that may be considered by the item recommendation engine 221 may include, for example, the expectation of repeat behavior, the preference data 245, interaction history 242, type of item, average rate of repeat behavior among all entities, number of entities that exhibit repeat behavior associated with the item 106, price of item 106, item category, behavior associated with prior recommendations of the item 106 presented to the entity, and so on.

In some embodiments, the item recommendation engine 221 assigns a score to one or more items in at least a subset of the item catalog 230 based at least in part on each of the factors. For example, the score may be based in part on the number of factors that meet or exceed certain threshold values. In other non-limiting examples, some factors may be assigned weighted values reflecting a level of emphasis or non-emphasis for that particular factor. For example, the item recommendation engine 221 may learn over time using machine learning techniques that recommendations for items associated with kitchen products are more likely to generate positive behavior than recommendations for items associated with office products. As such, the item category factor for a kitchen item may have a higher value than the item category factor for an office item. The item recommendations engine 221 may select one or more items 106 based at least in part on the score.

In some embodiments, the item recommendations engine 221 selects one or more items 106 based in part on a ranking of the scores (e.g., highest ranked, predefined percentage/quantity of highest ranked, etc.). In other embodiments, the item recommendation engine 221 may select one or more items 106 if the respective scores meet or exceed a particular threshold.

In some embodiments, the item recommendation engine 221 may interact with the electronic commerce application 218 with respect to generating network content with recommendations that can be provided by the electronic commerce application 218 to client devices 206 interacting with the electronic commerce application 218. For example, if the electronic commerce application 218 receives a request for a recommendation network page that includes recommendations for items that can be ordered through the electronic commerce application 218, the electronic commerce application 218 may request the item recommendation engine 221 to generate and provide a recommendation network page that is personalized for a particular entity.

According to other embodiments of the present disclosure, the electronic commerce application 218 may send network content to a client device 206 that includes a search query component (e.g., text box, audio input, etc.) configured to receive a search query. In response to receiving a search query from the client device 206, the electronic commerce application 218 may request the search application 224 to perform a search based on the search query and generate search results and/or retrieve cached search results according to the search query. In some embodiments, the search results may include a list of items from the item catalog 230. In response to receiving a request from the electronic commerce application 218, the search application 224 may analyze the search query and perform a search in accordance to the search query. In some embodiments, the search application 224 may generate network content comprising the search results and provide the network content to the electronic commerce application 218. The network content may be sent by the electronic commerce application 218 to the client device 206.

In other embodiments, the search application 224 may determine that the entity should be redirected to alternative network content (e.g., item detail page, shopping cart page with item automatically included in shopping cart, dialog box requesting confirmation to order item, etc.) associated with a particular item 106 instead of network content comprising the originally requested search results (e.g., search results page). In particular, the search application 224 may be able to predict the particular result (e.g., item 106) in which the entity 103 is interested based at least in part on the search query and/or a variety of other factors. The factors may include, for example, a past repeated behavior by the entity 103 with respect to an item 106, preference data 245, interaction history 242, specificity of the search query (e.g., brand name of item included), relationship to prior purchases, and so on. For example, if the interaction history 242 includes a prior purchase of a printer and the search query is for "printer ink," the search application 224 may predict that the entity 103 is interested in ink cartridges that are compatible with the printer that was previously purchased.

The factors may be evaluated in order to determine a level of confidence regarding whether a particular item 106 is the desired result of the entity requesting search results. For example, the factors may be assigned a score based in part on a sum of weighted values. If the score meets or exceeds a predefined threshold, the search application 224 may determine to redirect the entity 103 to the alternative network content rather than the network content including the search results. In some embodiments, the search application 224 may generate a hybrid search detail page such that one portion of the network content includes an item detail content associated with a particular item 106 and another portion of the network content includes at least a subset of the search results.

In other embodiments, the search application 224 may determine that alternative network content associated with a particular item 106 should be generated in response to a search query instead of network content comprising the search results based at least in part on a contractual agreement between a merchant and/or vendor associated with the item and the electronic marketplace. For example, the merchant data 236 and/or the redirect rules 239 may indicate that if a certain search query is received (e.g. "paper towels") that an alternative network page that includes content associated with an item 106 of the merchant should be provided instead of search results corresponding to the search query. In some embodiments, the search results page may be provided, but the order of the search results may be modified to reflect the contractual agreement between the merchant and electronic marketplace.

Regardless of the reason for redirection to alternative network content instead of network content including search results in response to receiving a search query, the electronic commerce application 218 may generate alternative network content that includes a selectable component (e.g., link, button, image, etc.) that, when selected, sends a request to the electronic commerce application 218 for the originally requested search results. The alternative network content may also include information related to the reason for redirecting the entity to the alternative network content instead of the originally requested search results.

Figure 3:
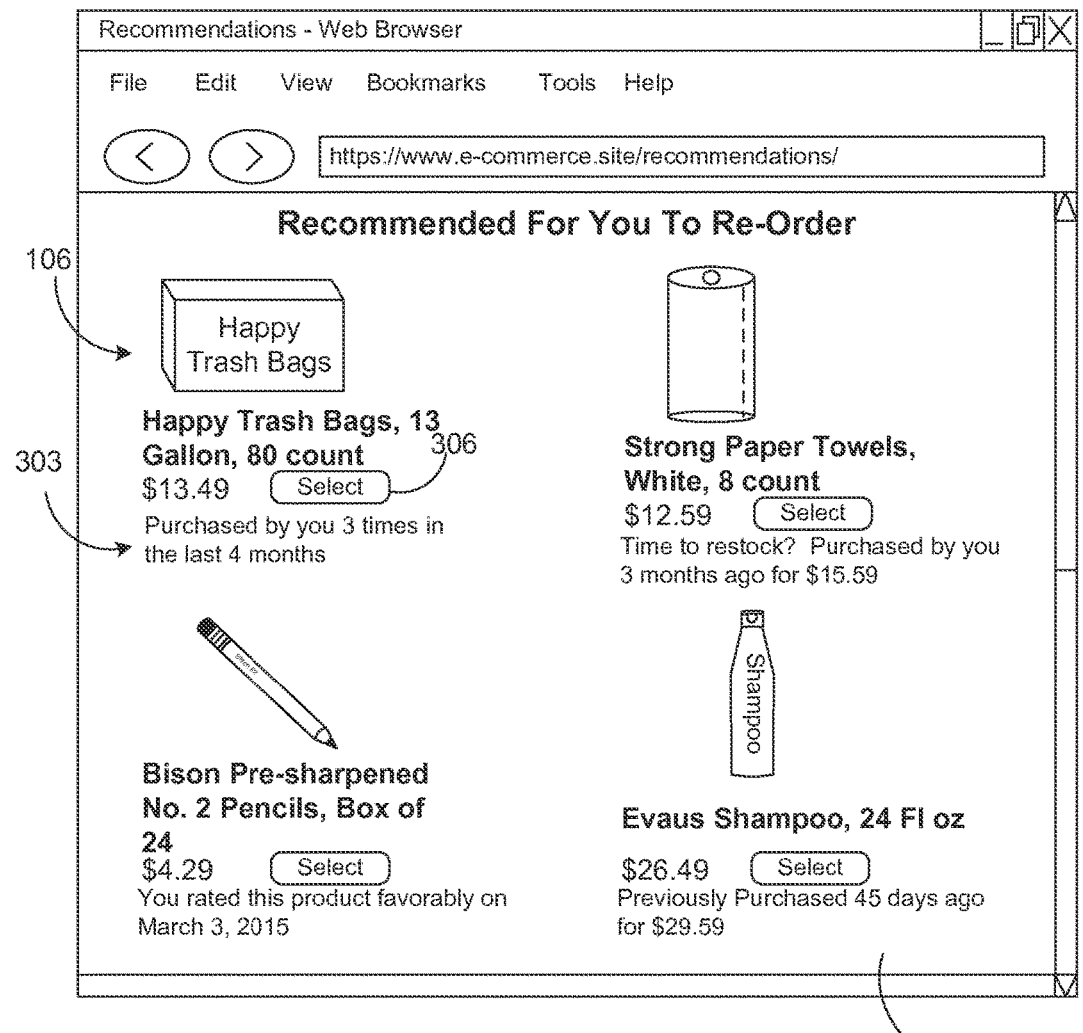
FIG. 3 is a pictorial diagram of an example user interface rendered by a client in the networked environment of FIG. 2 according to various embodiments of the present disclosure.

Referring next to FIG. 3, shown is a pictorial diagram of an example user interface 258a rendered in a client application 255 (FIG. 2) executed in a client device (FIG. 2) in the networked environment 200 (FIG. 2) according to various embodiments of the present disclosure. In particular, the example user interface 258a includes a recommendations network page 300 depicting personalized recommendations of items 106 that have been selected by the item recommendation engine 221 to present to the entity 103 via a rendered user interface 258 in a client application 255. In some non-limiting embodiments, the recommendations network page 300 may further include personalized item information 303 that may include details related to a specific recommendation. For example, the personalized item information 303 for the item 106 "Happy Trash Bags" indicates repeating behavior by the entity 103 with respect to the particular item 106. The recommendation network page 300 may include a selectable component 306 that, upon selection, may request an item detail page associated with the recommended item 106 to initiate the order process by requesting an order of the item 106, and/or other appropriate action.

Figure 4A:
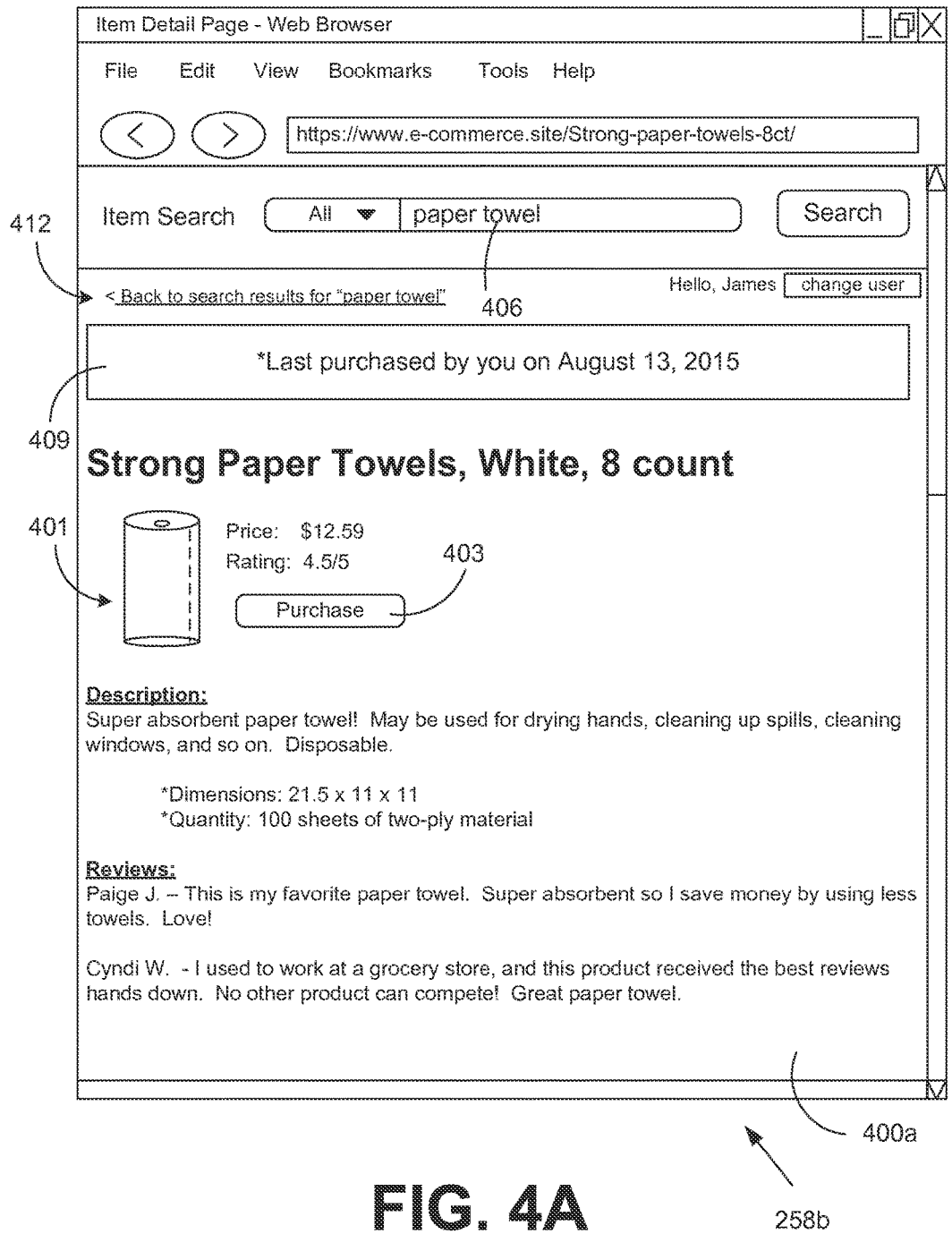
FIGS. 4A, 4B, and 4C are pictorial diagrams of example user interfaces rendered by a client in the networked environment of FIG. 2 according to various embodiments of the present disclosure.

Turning now to FIG. 4A, shown is a pictorial diagram of an example user interface 258b rendered in a client application 255 (FIG. 2) executed in a client device 206 (FIG. 2) in the networked environment 200 (FIG. 2) according to various embodiments of the present disclosure. In particular, the example user interface 258b includes an item detail page 400a presented in response to a search query 406. Specifically, the entity 103 has been redirected to the item detail page 400a instead of an originally requested search results page. The item detail page 400a includes information about a particular item 106 that has been selected according to a prediction and/or a contractual agreement associated with the search query. The item detail page 400a may include an item image 401 and a purchase component 403 as well as additional item detail information associated with the item 106. In some embodiments, the item detail page 400a may include personalized information 409 that emphasizes a known interest in the particular item. For example, the personalized information 409 of FIG. 4A indicates that the entity 103 previously purchased the item 106 on Aug. 13, 2015. The item detail page 400a further includes a selectable search results component 412. As such, if the entity 103 wants to review the search results, the entity 103 may select the selectable search results component 412 requesting to view a search results page associated with the search query 406.

Figure 4B:
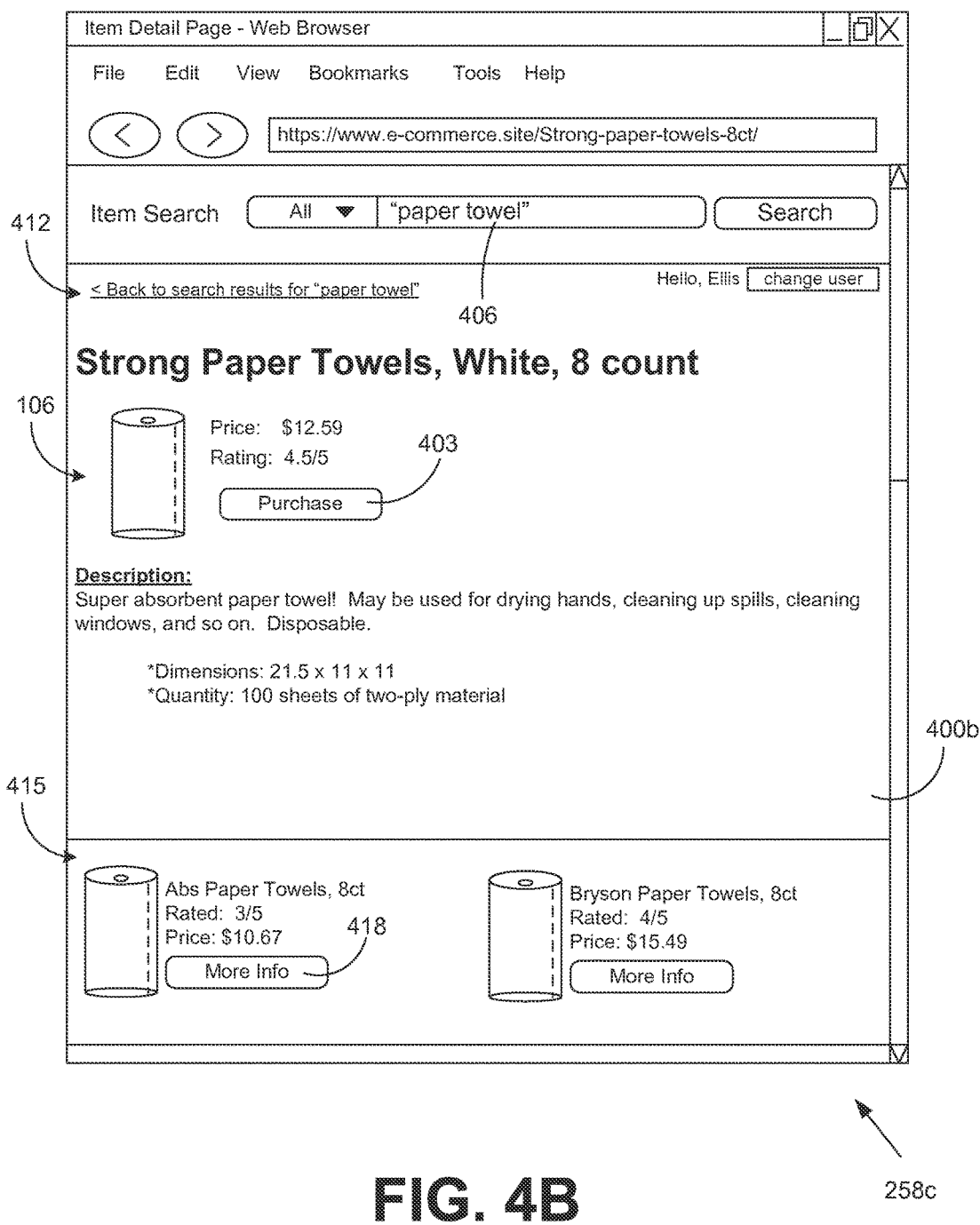

Moving on to FIG. 4B, shown is a pictorial diagram of an example user interface 258c rendered in a client application 255 (FIG. 2) executed in a client device 206 (FIG. 2) in the networked environment 200 (FIG. 2) according to various embodiments of the present disclosure. In particular, the example user interface 258c includes a hybrid search item detail page 400b presented in response to a search query 406. Specifically, the entity 103 has been redirected to the hybrid search item detail page 400b instead of an originally requested search results page.

A first portion of the hybrid search item detail page 400b includes information about a particular item 106 that has been selected according to a prediction and/or a contractual agreement associated with the search query. A second portion of the hybrid search item detail page 400b may include at least a portion of search results 415 associated with the search query 406. The first portion of the hybrid search item detail page 400b may include detailed information specific to the particular item 106, a purchase component 403, and other information/components. In addition, the second portion of the hybrid search item detail page 400b may include an additional information component 418 for each item 106 presented in the search results 415. Upon selection of the additional information component 418, the electronic commerce application 218 may receive a request for an item detail page associated with the corresponding item 106 presented in the second portion of the hybrid search item detail page 400b.

The hybrid search item detail page 400b includes a selectable search results component 412. As such, if the entity 103 wants to review the search results, the entity 103 may select the selectable search results component 412 requesting to view a search results page associated with the search query 406. Upon selection of the selectable search results component 412, the electronic commerce application 218 may receive the request for the search results page.

Figure 4C:
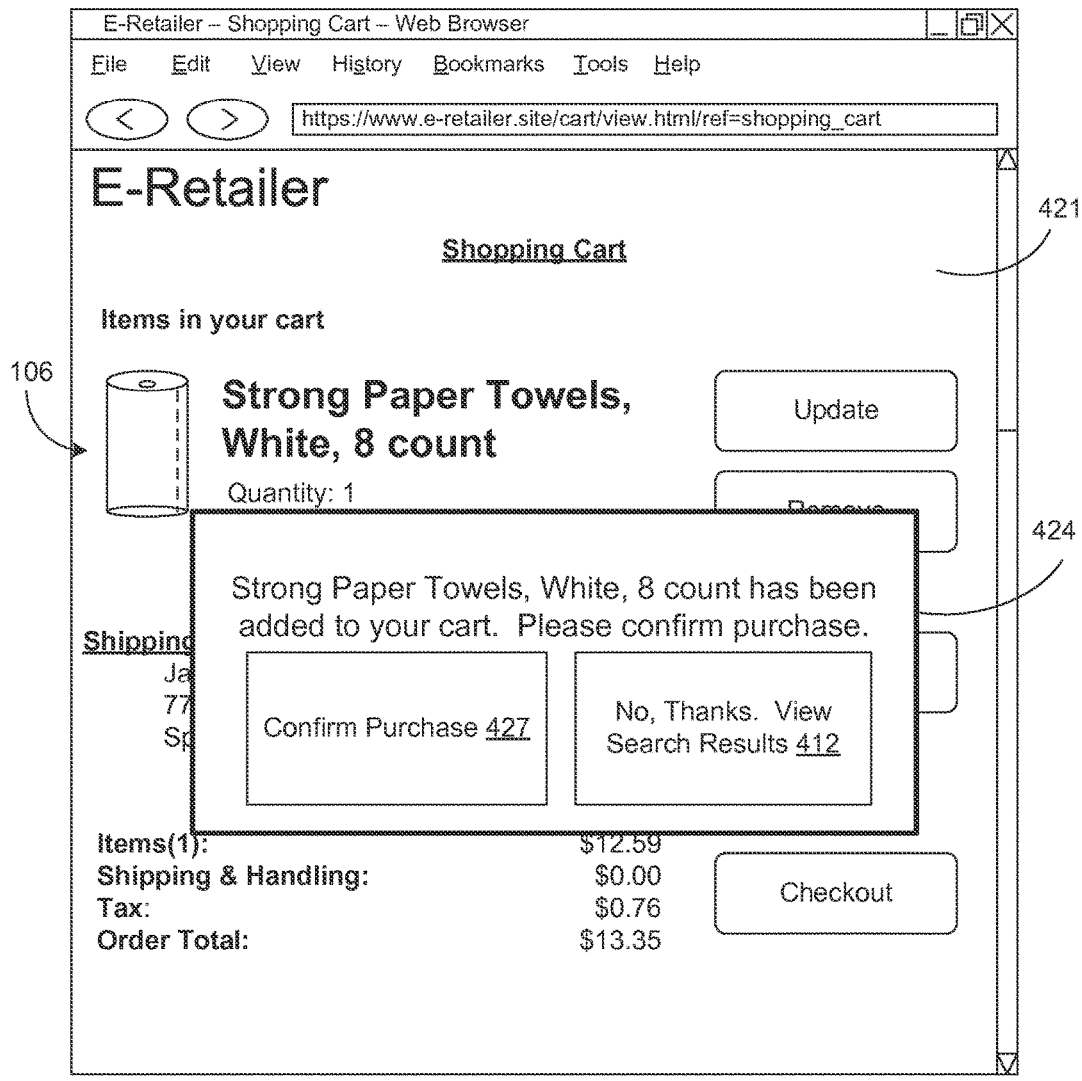

Turning now to FIG. 4C, shown is a pictorial diagram of an example user interface 258d rendered in a client application 255 (FIG. 2) executed in a client device 206 (FIG. 2) in the networked environment 200 (FIG. 2) according to various embodiments of the present disclosure. In particular, the example user interface 258d includes a shopping cart page 421 presented in response to a search query 406 and indicating that a particular item 106 has been automatically added to the shopping cart associated with the electronic commerce application 218. The example user interface 258d further includes a dialog box 424 requesting confirmation of the addition of the item 106 to the shopping cart for ordering. The dialog box 424 may include a confirmation component 427, a selectable search component 412, and/or any other component. Selection of the confirmation component 427 indicates approval of the addition of the item 106 to the shopping cart. Selection of the selectable search component 412 indicates a request for network content including the originally requested search results.

Figure 5:
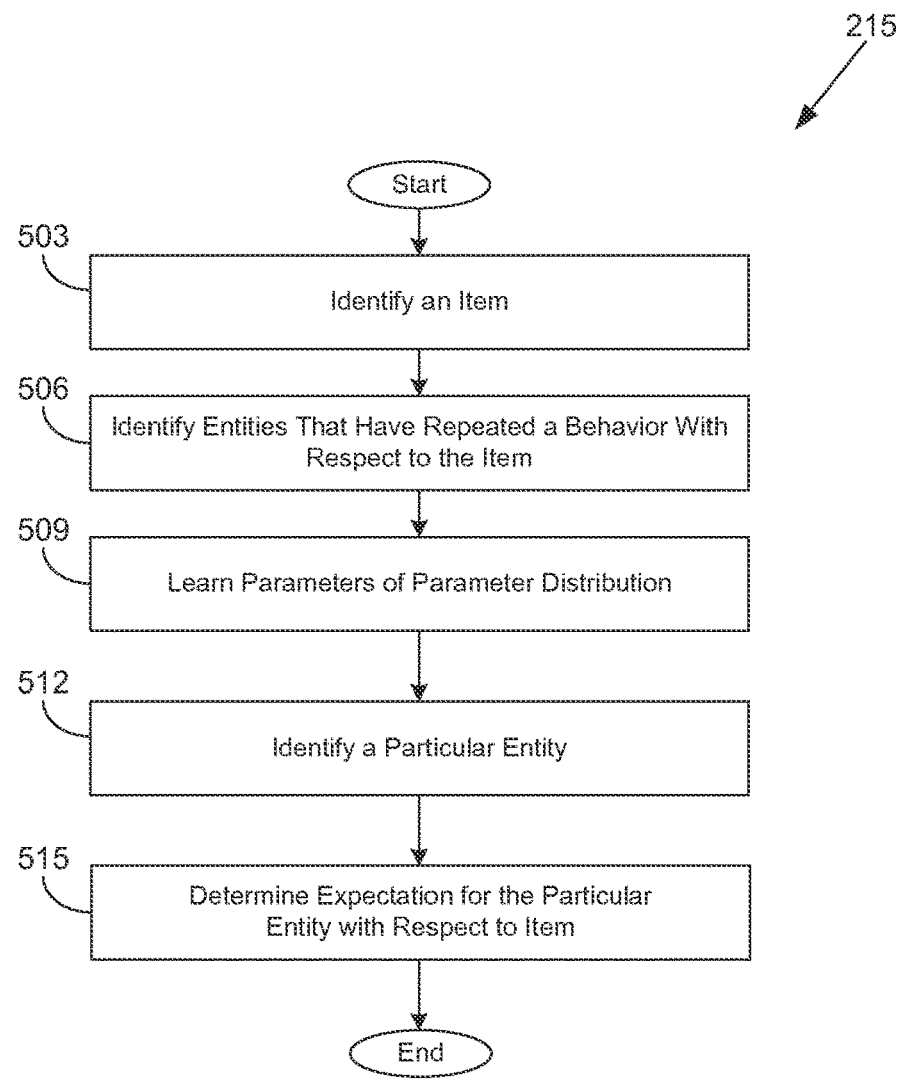
FIG. 5 is a flowchart illustrating one example of functionality implemented as portions of a repeat behavior estimator executed in a computing environment in the networked environment of FIG. 2 according to various embodiments of the present disclosure.

Referring next to FIG. 5, shown is a flowchart that provides one example of the operation of a portion of the repeat behavior estimator 215 according to various embodiments. It is understood that the flowchart of FIG. 5 provides merely an example of the many different types of functional arrangements that may be employed to implement the operation of the portion of the repeat behavior estimator 215 as described herein. As an alternative, the flowchart of FIG. 5 may be viewed as depicting an example of elements of a method implemented in the computing environment 203 (FIG. 2) according to one or more embodiments.

Beginning with box 503, the repeat behavior estimator 215 identifies an item 106. In some embodiments, the item 106 may be identified according to a periodic review of the item catalog 230. For example, the repeat behavior estimator 215 may periodically parse through the item catalog 230 to identify the item 106. In some embodiments, the repeat behavior estimator 215 may receive a request from the item recommendation engine 221, the electronic commerce application 218, and/or the search application 224. For example, the item recommendation engine 221 may request an expectation of repeat behavior for a specific item 106 that is identified in the request prior to determining which item to recommend. In some embodiments, an update to item data 251 may trigger the repeat behavior estimator 215 to determine an expectation of user behavior.

In box 506, the repeat behavior estimator 215 may identify one or more entities 103 from the entity data 227 that have exhibited repeat behavior (e.g., a purchase) with respect to the identified item 106. For example, the repeat behavior estimator 215 may parse through the entity data 227 (e.g., purchase history) identifying entities 103 that have repeated behavior with respect to the item 106. In box 509, the repeat behavior estimator 215 learns the parameters (e.g., shape $\alpha$, rate $\beta$, etc.) parameters for a parameter distribution (e.g., gamma, normal, curved, etc.). Using the average repeat behavior rates associated with each of the identified entities 103, the repeat behavior estimator 215 can determine the parameters for the parameter distribution via gradient descent and/or other types of optimization algorithms.

In box 512, the repeat behavior estimator 215 identifies a particular entity 103. In some embodiments, the repeat behavior estimator 215 may parse through the identified entities that have been identified as repeating the behavior with respect to the item 106 and calculate the expectation of repeat behavior associated with the item 106 for each entity 103. As such, the particular entity 103 is identified as the repeat behavior estimator 215 parses through the entities 103. In some embodiments, a request for the expectation of repeat behavior from the electronic commerce application 218, the item recommendation engine 221, and/or the search application 224 may include the particular entity 103. As such, the repeat behavior estimator 215 may identify the particular entity 103 through the request. For example, upon detection of the particular entity 103 interacting with the electronic marketplace, the electronic commerce application 218 may send a request to the repeat behavior estimator 215 requesting an expectation of repeat behavior by the entity 103 for one or more items 106.

In box 515, the repeat behavior estimator 215 determines the expectation of repeat behavior by the particular entity 103 with respect to the identified item 106. To determine the expectation of repeat behavior by the particular entity 103 with respect to the identified item 106, the repeat behavior estimator 215 may apply one or more repeat behavior models such as, for example, a maximum likelihood model, a Poisson-Gamma mixture model, or a modified Poisson-Gamma mixture model. Upon determining the expectation of repeat behavior by the particular entity 103, the portion of the repeat behavior estimator 215 ends.

Figure 6:
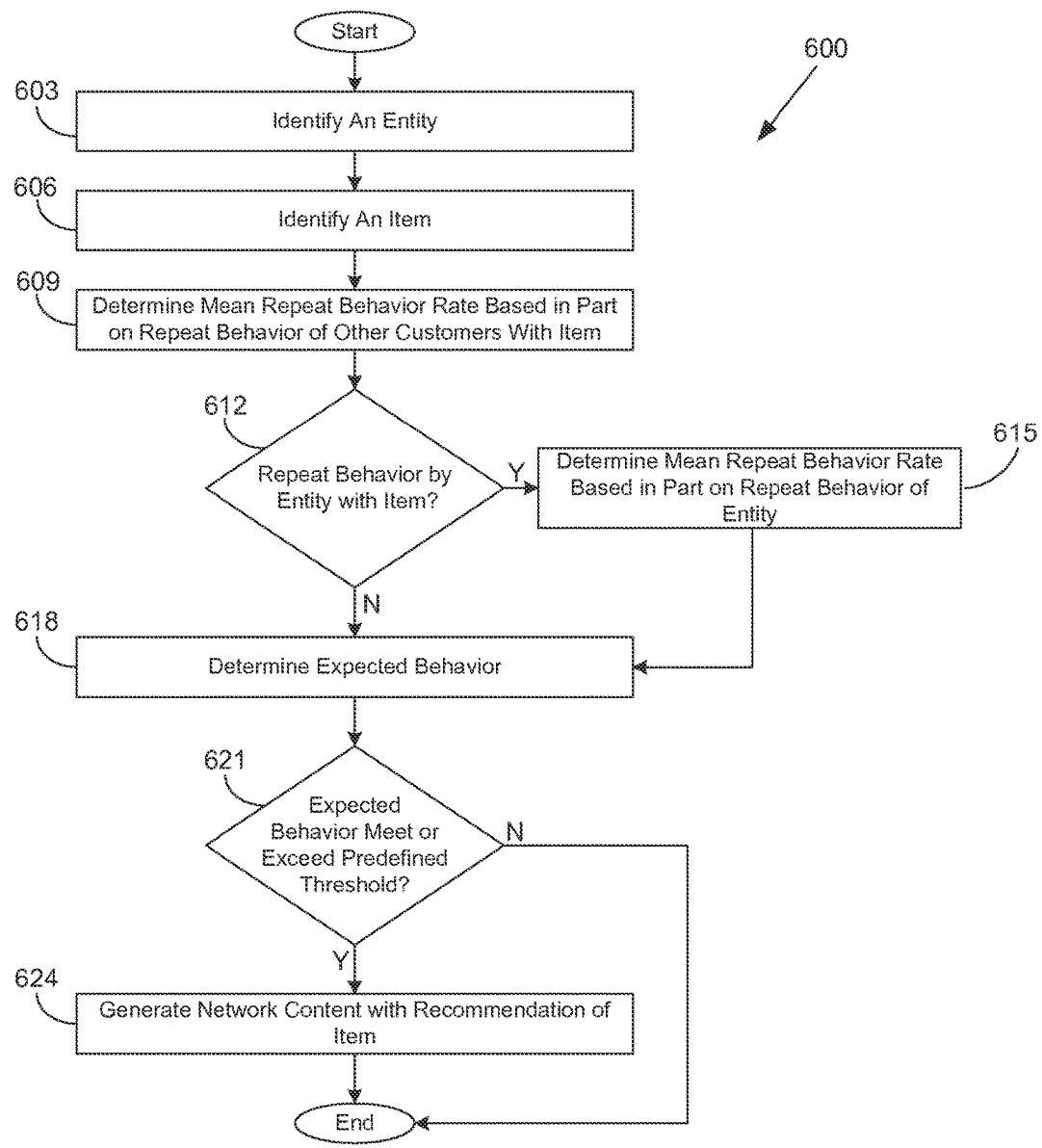
FIG. 6 is a flowchart illustrating one example of functionality implemented as portions of a repeat behavior estimator and an item recommendation engine executed in a computing environment in the networked environment of FIG. 2 according to various embodiments of the present disclosure.

Referring next to FIG. 6, shown is a flowchart 600 that provides one example of the operation of portions of the repeat behavior estimator 215 and the item recommendation engine 221 according to various embodiments. It is understood that the flowchart of FIG. 6 provides merely an example of the many different types of functional arrangements that may be employed to implement the operation of the portions of the repeat behavior estimator 215 and the item recommendation engine 221 as described herein. As an alternative, the flowchart 600 of FIG. 6 may be viewed as depicting an example of elements of a method implemented in the computing environment 203 (FIG. 2) according to one or more embodiments.

Beginning with box 603, the repeat behavior estimator 215 identifies an entity 103. In some embodiments, the repeat behavior estimator 215 may parse through the identified accounts and calculate the expectation of repeat behavior associated with the item 106 for each entity associated with the accounts. As such, the entity 103 is identified as the repeat behavior estimator 215 parses through each account. In some embodiments, a request for the expectation of repeat behavior from the electronic commerce application 218, the item recommendation engine 221, and/or the search application 224 may include a particular entity 103. As such, the repeat behavior estimator 215 may identify the entity 103 through the request.

For example, upon detection of a particular entity 103 interacting with the electronic marketplace, the electronic commerce application 218 may send a request to the repeat behavior estimator 215 requesting an expectation of repeat behavior by the entity 103 for one or more items 106. In another non-limiting example, the item recommendations engine 221 may send a request to the repeat behavior estimator 215 that includes identification of the entity 103.

In box 606, the repeat behavior estimator 215 identifies an item 106. In some embodiments, the item 106 may be identified in a request for an expectation of repeat behavior from an electronic commerce application 218, the item recommendation engine 221, and/or the search application 224. In other embodiments, the item 106 may be identified based at least in part on one or more factors associated with the entity 103. The one or more factors may include, for example, the entity repeat behavior rate 248, the item repeat behavior rate 252, the interaction history (e.g., purchasing history, browsing history, rating history, etc.), preference data 245, and/or other factors. For example, item 106 may be identified based in part on a determined interest in the item according to the one or more factors. In some embodiments, one or more items 106 from the item catalog 230 may be assigned a score based in part on the one or more factors and the identified item 106 may be based in part on a highest ranked score, whether the score meets or exceeds a predefined threshold and/or other factor.

In box 609, the repeat behavior estimator 215 determines the repeat behavior rate based in part on the repeat behavior of one or more entities who have exhibited repeat behavior associated with the item 106. As such, the repeat behavior estimator 215 may estimate the repeat behavior rate according to the repeat behavior rate for each entity who has exhibited repeat behavior associated with the item 106 and subsequently estimate the repeat behavior rate for the item.

In box 612, the repeat behavior estimator 215 determines whether the entity 103 has exhibited repeat behavior with respect to the item 106. For example, the repeat behavior estimator 215 may evaluate the interaction history 242 to determine whether the entity 103 has ordered the item 106 more than once. If the repeat behavior estimator 215 determines that the entity 103 has exhibited repeat behavior with respect to the item 106, the repeat behavior estimator 215 proceeds to box 612. Otherwise, the repeat behavior estimator 215 proceeds to box 615.

In box 612, the repeat behavior estimator 215 determines the mean repeat behavior rate based at least in part on the repeat behavior of the entity. The entity repeat behavior rate 248 may be based in part on the time $t_0$ that when the entity 103 first purchased an item 106, the time $t_{last}$ that the entity 103 last purchased the item 106, and the number of repeat behaviors "x" during a predefined time period. For example, the entity repeat behavior rate 248 may be determined according to Equation (1).

In box 618, the repeat behavior estimator 215 determines the expectation of repeat behavior by the entity 103 with respect to the item 106. To determine the expectation of repeat behavior by the entity 103 with respect to the identified item 106, the repeat behavior estimator 215 may apply one or more repeat behavior models such as, for example, a maximum likelihood model, a Poisson-Gamma mixture model, or a modified Poisson-Gamma mixture model. Upon determining the expectation of repeat behavior, the repeat behavior estimator 215 may store the expectation in a database associated with the entity data 227, the item catalog 230, and/or other suitable location. In other embodiments, the repeat behavior estimator 215 may send the expectation of repeat behavior to the item recommendation engine 221, the electronic commerce application 218, and/or the search application 224 in response to a request for the expectation of repeat behavior by the entity 103 with respect to the item 106.

In box 621, the item recommendation engine 221 determines whether the expectation of repeat behavior meets or exceeds a predefined threshold. If the expectation of repeat behavior meets or exceeds the predefined threshold, the item recommendation engine 221 proceeds to box 624. Otherwise, the portions of the item recommendation engine 221 and repeat behavior estimator 215 end.

In box 624, the item recommendation engine 221 generates network content including the recommendation of the item 106. In some embodiments, the item recommendation engine 221 sends the network content to a client device 206, sends the network content to the electronic commerce application 218, stores the network content in a data store 212, and/or other performs another action. After the item recommendation engine 221 generates the network content, the portions of the item recommendation engine 221 and repeat behavior estimator 215 end.

Figure 7:
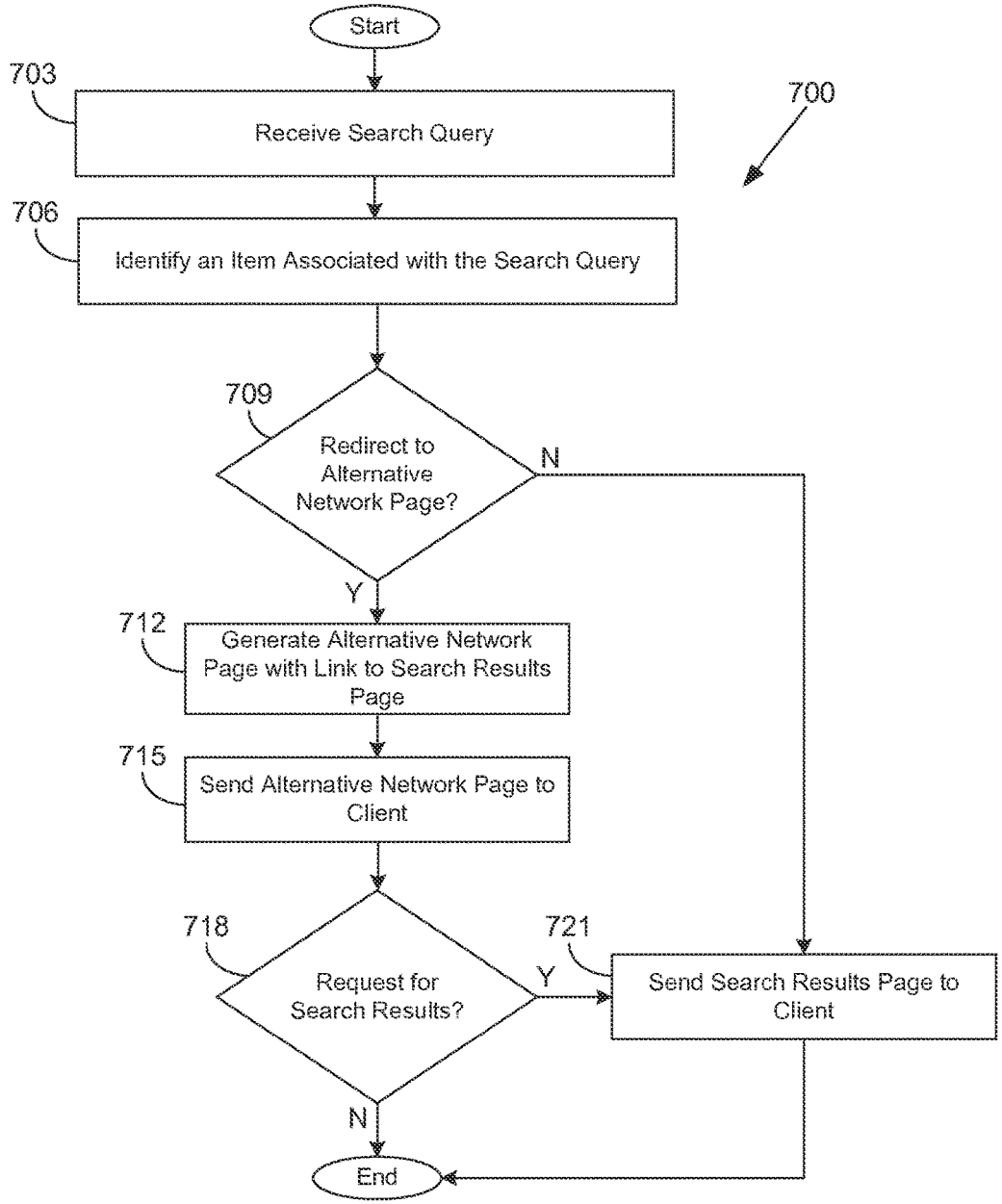
FIGS. 7 and 8 are flowcharts illustrating examples of functionality implemented as portions of an electronic commerce application and a search application executed in a computing environment in the networked environment of FIG. 2 according to various embodiments of the present disclosure.

Referring next to FIG. 7, shown is a flowchart 700 that provides one example of the operation of portions of the search application 224 and the electronic commerce application 218 according to various embodiments. It is understood that the flowchart of FIG. 7 provides merely an example of the many different types of functional arrangements that may be employed to implement the operation of the portions of the search application 224 and the electronic commerce application 218 as described herein. As an alternative, the flowchart of FIG. 7 may be viewed as depicting an example of elements of a method implemented in the computing environment 203 (FIG. 2) according to one or more embodiments.

Beginning with box 703, the search application 224 receives a search query 406. In some embodiments, the search application 224 receives a search query 406 (FIGS. 4A and 4B) directly from a client device 206 (FIG. 2) in response to the search query 406 being submitted via a search query component (e.g., text box, audio input component, etc.) on a network page associated with the electronic commerce application 218 rendered in the client device 206. In other embodiments, the search application 224 receives the search query 406 from the electronic commerce application 218 in response to the electronic commerce application 218 receiving the search query from a client device 206.

In box 706, the search application 224 identifies an item 106 associated with the search query 406. In some embodiments, the item 106 may be identified from search results generated by the search application 224 in response to receiving the search query. In other embodiments, the item 106 may be identified based at least in part on relevance to the search query, keywords matching all or part of the search query, and one or more factors. The one or more factors may include, for example, terms of a contractual agreement, previous results from a similar search query associated with the entity 103, entity data 227, preference data 245, and/or other factors. For example, a contractual agreement may specify a specific item with respect to a particular search query. In another non-limiting example, an item 106 may be identified in part on behavior associated with a previous presentation of search results following a similar search query (e.g., selection and purchase of an item in prior search results).

In box 709, the search application 224 determines whether to redirect the entity 103 to alternative network content specific to the item 106 instead of network content including the originally requested search results. In some embodiments, the search application 224 may be able to predict the particular result (e.g., item 106) that the entity 103 is interested in based at least in part on the search query and/or a variety of other factors. The factors may include, for example, repeated behavior by the entity 103 with respect to an item 106, preference data 245, interaction history 242, specificity of the search query (e.g., brand name of item included), relationship to prior purchases, and so on. The factors may be evaluated in order to determine a level of confidence regarding whether a particular item 106 is the desired result of the entity 103 requesting search results. For example, the factors may be assigned a score based in part on a sum of weighted values. If the score meets or exceeds a predefined threshold, the search application 224 may determine to redirect the entity 103 to alternative network associated with the particular item 106 rather than the originally requested search results associated with the search query 406.

For example, in some embodiments, the search application 224 may determine to redirect the entity 103 to the item detail page 400a, 400b (FIGS. 4A and 4B) of the particular item 106 rather than the search results page including search results associated with the search query 406. In other embodiments, the search application 224 may determine to redirect the entity 103 to shopping cart network content 421 (FIG. 4C indicating that the item 106 has been added to the shopping cart. The network content may include a dialog box 424 (FIG. 4C) requesting a confirmation for the addition of the item 106 to the shopping cart. The dialog box 424 may further include a search results component 412 that, when selected, requests network content including the originally requested search results.

In other embodiments, the search application 224 may determine that alternative network content associated with a particular item 106 should be generated in response to a search query instead of a search results page based at least in part on a contractual agreement between a merchant and/or vendor associated with the item and the electronic marketplace. For example, the merchant data 236 and/or the redirect rules 239 may indicate that if a certain search query is received (e.g., "paper towels") that alternative network content (e.g., item detail page, shopping cart network page with item automatically added, etc.) associated with an item 106 of the merchant should be provided instead of search results corresponding to the search query.

If the search application 224 determines that the entity 103 should be redirected to the alternative network content instead of the originally requested search results, the flowchart 700 proceeds to box 712. Otherwise, the flowchart 700 proceeds to box 721.

In box 712, alternative network content is generated for the item 106 and includes a selectable search results component 412 that, when selected, requests the search results page associated with the search query 406. In some embodiments, the alternative network content may be generated by the search application 224. In other embodiments, the search application 224 may send a request to the electronic commerce application 218 instructing the electronic commerce application 218 to generate the alternative network content associated with the item 106. In box 715, the alternative network content is sent to the client device 206 in response to the request for the search results associated with the search query. In box 718, the electronic commerce application 218 determines whether a request for the search results following the rendering of the alternative network content has been received. If a request for the search results is received, the flowchart 700 proceeds to box 721. Otherwise, the flowchart 700 ends. In box 721, a search results page is generated including search results from the search query 406 and the search results page is sent to the client device 206. In response to sending the search results page to the client device 206, the flowchart 700 ends.

Figure 8:
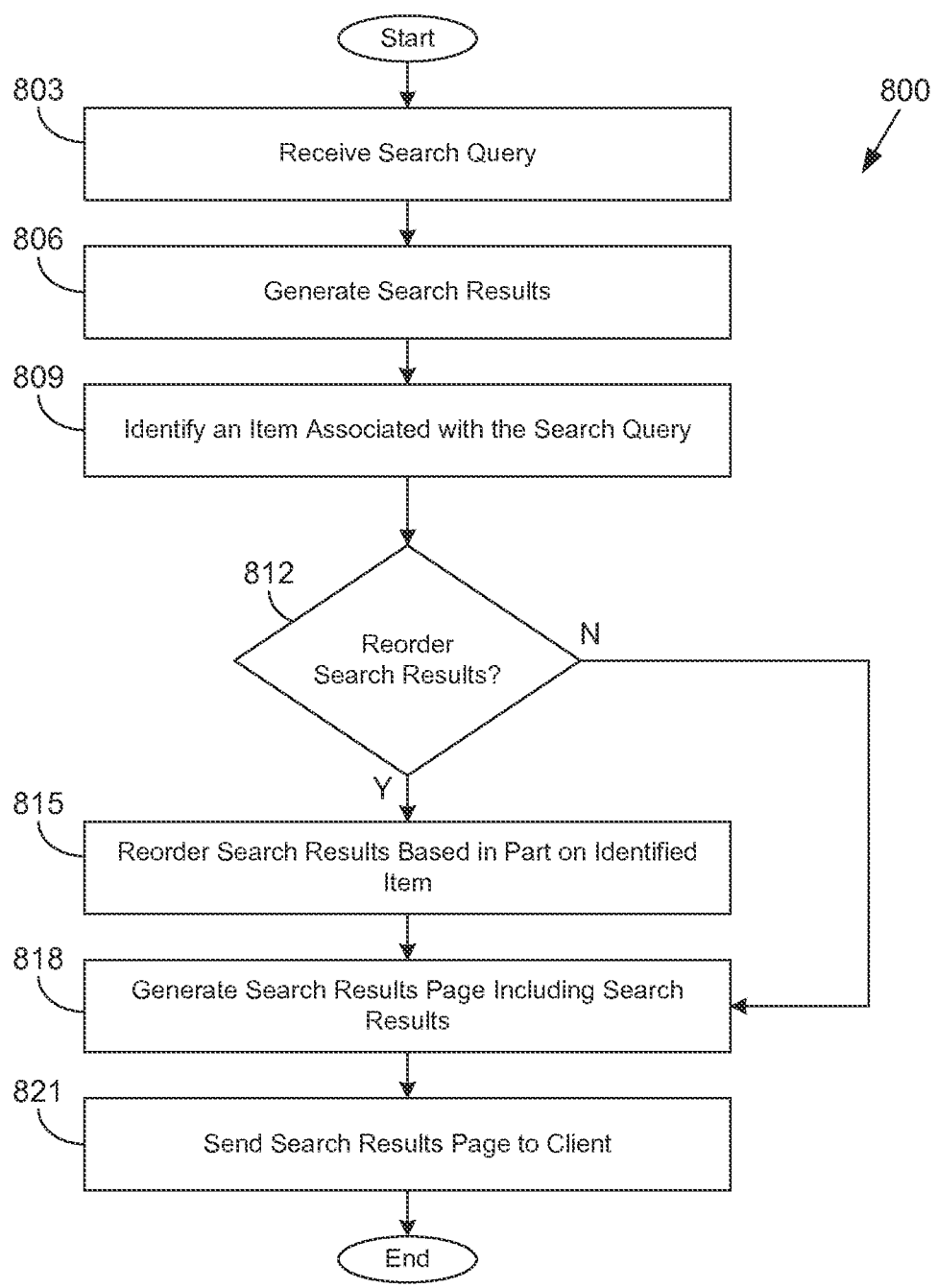

Referring next to FIG. 8, shown is a flowchart 800 that provides one example of the operation of portions of the search application 224 and the electronic commerce application 218 according to various embodiments. It is understood that the flowchart of FIG. 8 provides merely an example of the many different types of functional arrangements that may be employed to implement the operation of the portion of the search application 224 and the electronic commerce application 218 as described herein. As an alternative, the flowchart 800 of FIG. 8 may be viewed as depicting an example of elements of a method implemented in the computing environment 203 (FIG. 2) according to one or more embodiments.

Beginning with box 803, the search application 224 receives a search query 406. In some embodiments, the search application 224 receives a search query 406 (FIGS. 4A and 4B) directly from a client device 206 (FIG. 2) in response to the search query 406 being submitted via a search query component (e.g., text box, audio input component, etc.) on a network page associated with the electronic commerce application 218 rendered in the client device 206. In other embodiments, the search application 224 receives the search query 406 from the electronic commerce application 218 in response to the electronic commerce application 218 receiving the search query from a client device 206.

In box 806, electronic commerce application 218 may request the search application 224 (FIG. 2) to generate search results associated with the search query 406. Accordingly, the search application 224 may generate search results according to the search query. In some embodiments, the search application 224 may generate the search results based in part of an evaluation of the item catalog 230 and/or other data accessible via the computing environment 203. In other embodiments, the search application 224 may request search results from a third-party search engine capable of generating search results by accessing and mining data associated with databases independent of the computing environment 203. In some embodiments, the search results are further based at least in part on the entity data 227 and/or other information. In other embodiments, the search results may be retrieved from cached search results that were previously generated from a same and/or similar search query 406.

In box 809, the search application 224 identifies an item 106 associated with the search query 406. In some embodiments, the item 106 may be identified from search results generated by the search application 224 in response to receiving the search query. In other embodiments, the item 106 may be identified based at least in part on the search query and one or more factors. The factors may include, for example, terms of a contractual agreement, previous results from a similar search query associated with the entity 103, entity data 227, preference data 245, and/or other factors. For example, a contractual agreement may specify a specific item with respect to a particular search query. In another non-limiting example, an item 106 may be identified in part on behavior associated with a previous presentation of search results following a similar search query (e.g., selection and purchase of an item in prior search results).

In box 815, the search application 224 determines whether to reorder the search results. The search application 224 may evaluate one or more factors including, user data, expectation of repeat behavior, terms of a contractual agreement, and/or other factors to determine whether to reorder the search results. For example, an evaluation of the entity data 227 may indicate an interest and/or preference for a particular item 106. Accordingly, if a level of confidence meets or exceeds a predefined threshold, the search application 224 may determine to reorder the search results so that the item is included at and/or near the top of the list when presented to the entity 103 via a search results page rendered in the client device 206. In other embodiments, a contractual agreement may indicate that, for a particular search query, a particular item should be listed at or near the top of the search results. If the search application 224 determines that the search results should be reordered, the flowchart 800 proceeds to box 815. Otherwise, the flowchart 800 proceeds to box 818.

In box 815, the search application reorders the search results based at least in part on the identified item 106. In some embodiments, the search application 224 may rank the expectation of repeat behavior for each item in the search results and reorder the search results according to the ranking. In other embodiments, the search application 224 may evaluate multiple factors and assign a score to each item in the search results based in part on the evaluation. The factors may include, for example, an expectation of repeated behavior, user preference, interaction history 242, contractual agreements, prior behavior with respect to similar searches and/or other factors. The scores may be assigned based on a sum of weighted values for each evaluated factor. The scores may be ranked and the search results may be reordered according to the ranking.

In other embodiments, the search application 224 may reorder the search results according to a contractual agreement between a merchant and/or vendor and the electronic marketplace. For example, the search application 224 may reorder the search results so that a particular item 106 is presented at or near the top of the search results listing based at least in part on terms of a contractual agreement. In box 818, the search results page including the search results is generated. In box 821, the search results are sent to the client device 206. Upon sending the search results to the client device 206, the flowchart 800 ends.

Figure 9:
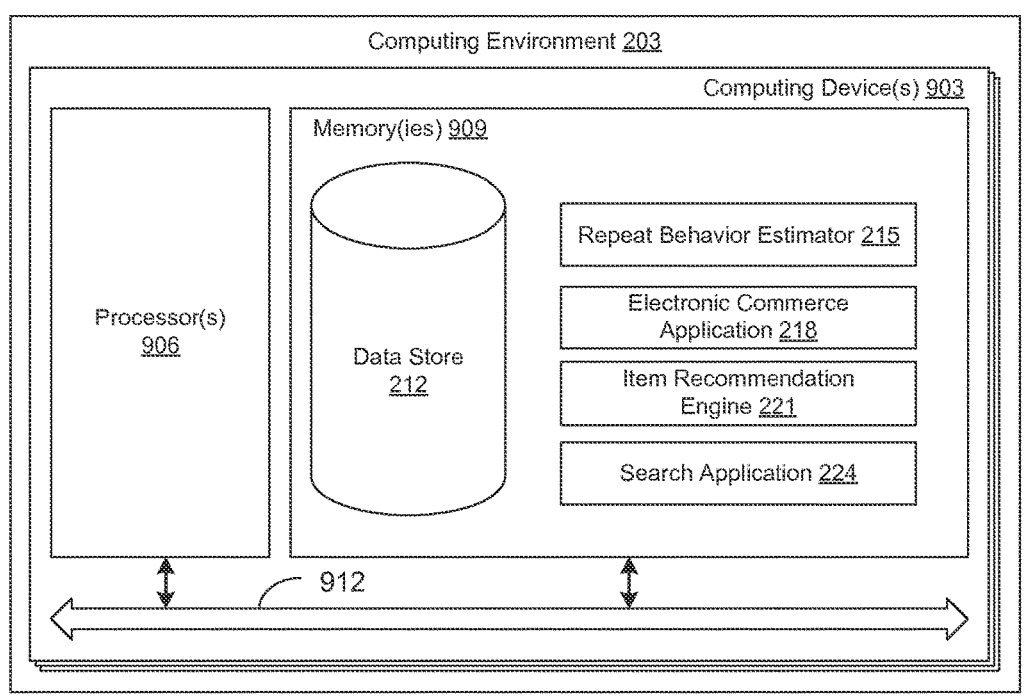
FIG. 9 is a schematic block diagram that provides one example illustration of a computing environment employed in the networked environment of FIG. 2 according to various embodiments of the present disclosure.

With reference to FIG. 9, shown is a schematic block diagram of the computing environment 203 according to an embodiment of the present disclosure. The computing environment 203 includes one or more computing devices 903. Each computing device 903 includes at least one processor circuit, for example, having a processor 906 and a memory 909, both of which are coupled to a local interface 912. To this end, each computing device 903 may comprise, for example, at least one server computer or like device. The local interface 912 may comprise, for example, a data bus with an accompanying address/control bus or other bus structure as can be appreciated.

Stored in the memory 909 are both data and several components that are executable by the processor 906. In particular, stored in the memory 909 and executable by the processor 906 are a repeat behavior estimator 215, an electronic commerce application 218, an item recommendation engine 221, a search application 224, and potentially other applications. Also stored in the memory 909 may be a data store 212 and other data. In addition, an operating system may be stored in the memory 909 and executable by the processor 906.

It is understood that there may be other applications that are stored in the memory 909 and are executable by the processor 906 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 909 and are executable by the processor 906. In this respect, the term "executable" means a program file that is in a form that can ultimately be run by the processor 906. Examples of executable programs may be, for example, a compiled program that can be translated into machine code in a format that can be loaded into a random access portion of the memory 909 and run by the processor 906, source code that may be expressed in proper format such as object code that is capable of being loaded into a random access portion of the memory 909 and executed by the processor 906, or source code that may be interpreted by another executable program to generate instructions in a random access portion of the memory 909 to be executed by the processor 906, etc. An executable program may be stored in any portion or component of the memory 909 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 909 is defined herein as including both volatile and nonvolatile memory and data storage components. Volatile components are those that do not retain data values upon loss of power. Nonvolatile components are those that retain data upon a loss of power. Thus, the memory 909 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 906 may represent multiple processors 906 and/or multiple processor cores and the memory 909 may represent multiple memories 909 that operate in parallel processing circuits, respectively. In such a case, the local interface 912 may be an appropriate network that facilitates communication between any two of the multiple processors 906, between any processor 906 and any of the memories 909, or between any two of the memories 909, etc. The local interface 912 may comprise additional systems designed to coordinate this communication, including, for example, performing load balancing. The processor 906 may be of electrical or of some other available construction.

Although the repeat behavior estimator 215, the electronic commerce application 218, the item recommendation engine 221, the search application 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-8 show the functionality and operation of implementations of portions of the repeat behavior estimator 215, the electronic commerce application 218, the item recommendation engine 221, and the search application 224. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 906 in a computer system or other system. The machine code may be converted from the source code, etc. If embodied in hardware, each block may represent a circuit or a number of interconnected circuits to implement the specified logical function(s).

Although the flowcharts of FIGS. 5-8 show a specific order of execution, it is understood that the order of execution may differ from that which is depicted. For example, the order of execution of two or more blocks may be scrambled relative to the order shown. Also, two or more blocks shown in succession in FIGS. 5-8 may be executed concurrently or with partial concurrence. Further, in some embodiments, one or more of the blocks shown in FIGS. 5-8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the repeat behavior estimator 215, the electronic commerce application 218, the item recommendation engine 221, and the search application 224, that comprises software or code can be embodied in any non-transitory computer-readable medium for use by or in connection with an instruction execution system such as, for example, a processor 906 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the repeat behavior estimator 215, the electronic commerce application 218, the item recommendation engine 221, and the search application 224, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 90 or in multiple computing devices in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein, when executed, the program causes the at least one computing device to at least:
    identify a plurality of entities that have repeated a behavior associated with an item;
    determine one or more parameters for a predefined distribution based at least in part on a repetition of the behavior by the plurality of entities;
    identify a specific entity of the plurality of entities interacting with a first network content;
    determine a repeat rate distribution of the specific entity associated with the item based at least in part on one or more occurrences of the behavior;
    determine an expectation of repeat behavior by the specific entity with respect to the item based at least in part on the one or more parameters and the repeat rate distribution;
    receive a search query via the first network content requesting a search results network page including a listing of search results associated with the search query;
    generate the listing of search results associated with the search query, the listing of search results including the item;

determine to automatically redirect the specific entity to an item detail page instead of the search results page based at least in part on the expectation of the repeat behavior of the item and a time period associated with the interaction of the first network content;

generate a second network content including the item detail pace and a recommendation to repeat the behavior associated with the item; and send the second network content to a client device associated with the specific entity.

2. The non-transitory computer-readable medium of claim 1, wherein the item is one of a plurality of items, and the program further causes the at least one computing device to at least:

rank individual ones of the plurality of items based at least in part on a respective expectation of future repeat behavior by the specific entity for the individual ones of the plurality of items, the second network content including a highest ranked item of the plurality of items.

3. A method, comprising:

determining, via at least one computing device, an expectation of a specific entity repeating a behavior associated with an item based at least in part on a repeat behavior by a plurality of entities with respect to the item;

determining, via the at least one computing device, that the specific entity is currently interacting with network content;

receiving, via the at least one computing device, a request for a search results page corresponding to a plurality of items, the request being received via an interaction with a first network page, and the item being included in the plurality of items;

selecting, via the at least one computing device, the item from the plurality of items based at least in part on the expectation of the specific entity repeating the behavior;

determining, via the at least one computing device, to automatically redirect the specific entity from the first network page to a second network page, the second network page being different from the search results page;

generating, via the at least one computing device, the second network page comprising an item detail page and including a recommendation to repeat the behavior; and sending, via the at least one computing device, the second network page instead of the search results page to a client device associated with the specific entity.

4. The method of claim 3, wherein the expectation of repeating the behavior is based in part on a modified Poisson-Gamma Mixture Model (MPGMM), and determining the expectation of repeating the behavior further comprises determining one or more parameters based at least in part on at least one of the repeat behavior by the plurality of entities or the repeat behavior by the specific entity.

5. The method of claim 3, wherein the expectation of repeating the behavior is based at least in part on a repeat behavior rate by the specific entity regarding the item.

6. The method of claim 5, wherein the repeat behavior rate is determined according to a first time of the behavior by the specific entity, a last time of the behavior by the specific entity, and a number of times the specific entity exhibited the behavior during a predetermined time period.

7. The method of claim 3, further comprising ranking, via the at least one computing device, the plurality of items according to a respective expectation of repeating the behavior, the item being a highest ranked item of the plurality of items.

8. The method of claim 3, wherein selection of the item from the plurality of items is further based at least in part on one or more factors, the one or more factors including at least one of an entity preference, a time period since a last occurrence of the behavior by the specific entity, a type of item, an item category, a price of the item, a number of instances the specific entity has repeated the behavior, or a number of entities who have exhibited the repeat behavior associated with the item.

9. A system, comprising:

at least one computing device; and at least one application executable on the at least one computing device, wherein, when executed, the at least one application causes the at least one computing device to at least:

determine an expectation of a specific entity repeating a behavior associated with an item based at least in part on a repeat behavior by a plurality of entities with respect to the item;

receive a request for a search results page corresponding to a plurality of items, the request being received via an interaction with a first network page, and the item being included in the plurality of items;

select the item from the plurality of items based at least in part on the expectation of the specific entity repeating the behavior;

determine to automatically redirect the specific entity from the first network page to a second network page, the second network page being different from the search results page;

generate the second network page comprising an item detail page and including a recommendation to repeat the behavior; and send the second network page instead of the search results page to a client device associated with the specific entity.

10. The system of claim 9, wherein the expectation of repeating the behavior is based at least in part on a repeat behavior rate by the specific entity regarding the item.

11. The system of claim 10, wherein the repeat behavior rate is determined according to a first time of the behavior by the specific entity, a last time of the behavior by the specific entity, and a number of times the specific entity exhibited the behavior during a predetermined time period.

12. The system of claim 9, wherein, when executed, the at least one application causes the at least one computing device to at least rank the plurality of items based at least in part on a respective expectation of repeat behavior for individual items of the plurality of items.

13. The system of claim 12, wherein determining to automatically redirect the specific entity from the first network page to the second network page is based at least in part on the item being a highest ranked item of the plurality of items.

14. The system of claim 9, wherein, when executed, the at least one application causes the at least one computing device to at least generate the plurality of items in response to receiving the request for the search results page.

15. The system of claim 9, wherein selection of the item from the plurality of items is further based at least in part on at least one of an entity preference, a time period since a last occurrence of the behavior by the specific entity, a type of item, an item category, a price of the item, a number of instances the specific entity has repeated the behavior, or a number of entities who have exhibited the repeat behavior associated with the item.

16. The system of claim 9, wherein determining to automatically redirect the specific entity from the first network page to the second network page is based at least in part on the expectation of the specific entity repeating the behavior meeting or exceeding a predefined threshold.

17. The non-transitory computer-readable medium of claim 1, wherein the expectation of repeating the behavior is based in part on a modified Poisson-Gamma Mixture Model (MPGMM).

18. The non-transitory computer-readable medium of claim 1, wherein the one or more occurrences of the behavior comprise at least one of: a first time of the behavior by the specific entity, a last time of the behavior by the specific entity, and a number of times the specific entity exhibited the behavior during a predetermined time period.

19. The method of claim 3, wherein determining to automatically redirect the specific entity from the first network page to the second network page is based at least in part on the item being a highest ranked item of the plurality of items.

20. The method of claim 3, further comprising generating the plurality of items in response to receiving the request for the search results page.

* * * * *